Mar. 20, 1923.

A. J. PARKHURST.
ANTISKID DEVICE.
FILED SEPT. 25, 1922.

1,448,859.

Inventor
Albert J. Parkhurst

Patented Mar. 20, 1923.

1,448,859

UNITED STATES PATENT OFFICE.

ALBERT JOHN PARKHURST, OF CALEDONIA, ONTARIO, CANADA, ASSIGNOR OF ONE-HALF TO PERCY FORD-SMITH, OF HAMILTON, ONTARIO, CANADA.

ANTISKID DEVICE.

Application filed September 25, 1922. Serial No. 590,483.

*To all whom it may concern:*

Be it known that I, ALBERT JOHN PARKHURST, of the village of Caledonia, in the county of Haldimand, in the Province of Ontario, Dominion of Canada, have invented certain new and useful Improvements in Antiskid Devices, of which the following is the specification.

My invention relates to improvements in anti-skid devices and the object of the invention is to provide a simple and inexpensive attachment which may be quickly and conveniently mounted and dismounted upon a vehicle wheel, and a further object is to provide such a device which, when mounted, cannot accidentally become disengaged, and which will permit sufficient looseness of fit upon the tire so that the wear will be reduced to a minimum.

My invention consists essentially of a rigid bracket adapted to engage the wheel felly between adjacent spokes, a chain secured to one end of the bracket and passing over the tire, and means for securing the other end of the chain to the opposite end of the bracket, so that the bracket and chain are thus secured in position upon the wheel, all as hereinafter more particularly described and illustrated in the accompanying drawings in which:—

In the drawings like characters of reference indicate corresponding parts in the different views.

Figure 1:
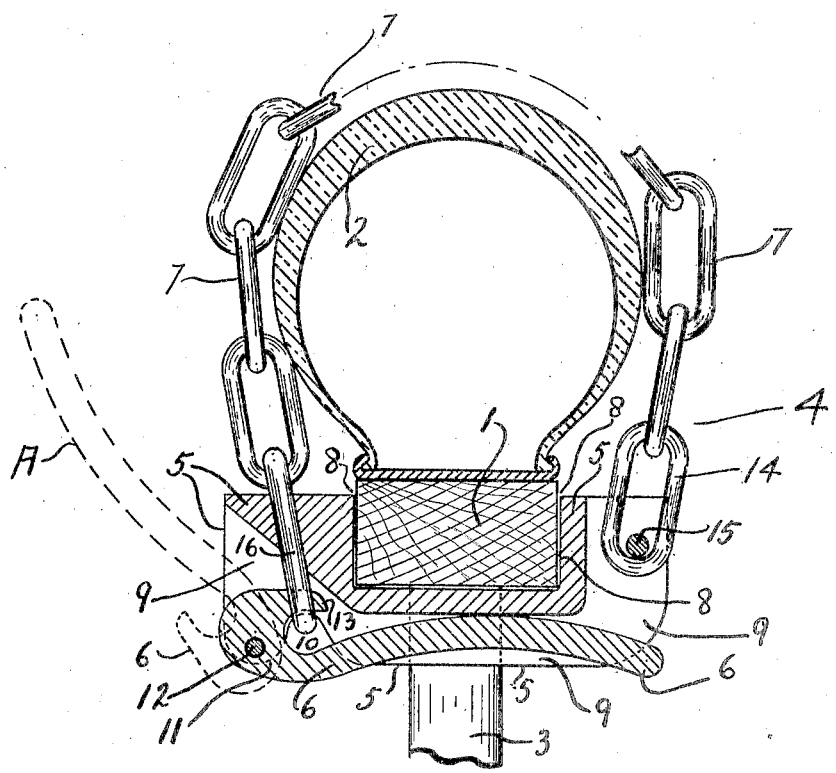
Fig. 1 is a transverse section through a portion of a vehicle wheel, showing my invention mounted thereon, a rigid bracket and a locking finger carried thereby, being shown in central longitudinal section and a chain used in my invention being shown broken away intermediately.
Figure 2:
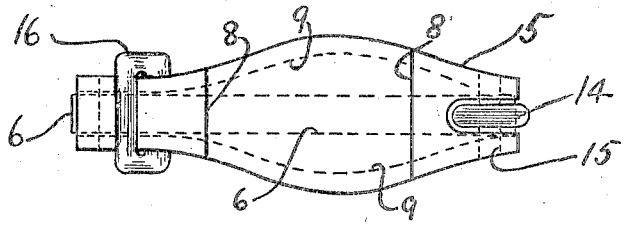
Fig. 2 is a top plan view of the bracket showing the connection thereto of the two end links of the chain.

1 is the felly of a vehicle wheel upon which is carried, after the usual manner, the tire 2.

3 is one of the spokes of the wheel.

4 indicates collectively my improved device, which comprises the rigid bracket 5, the locking lever 6, and the chain 7.

The bracket 5 is provided on its outer side with a transverse recess 8 situated intermediately of the length of the bracket.

The inner side of the bracket 5 is provided with a longitudinal recess 9 extending the entire length of the bracket, and also adjacent to one end with an outwardly extending transverse recess 10, which latter recess forms the lugs 11 on the sides of the bracket at that end.

The locking lever 6 is hingedly connected at one end to the bracket 5 by the pin 12, which is mounted in the lugs 11.

13 is an inwardly directed hook formed on the lever 6 adjacent to the hinge connection 12.

The lever 6 engages within the longitudinal recess 9 in the bracket and, when in the locked position (full lines in Fig. 1) the hook 13 registers with the top of the transverse recess 10.

One end link 14 of the chain 7 is connected to the bracket within the recess 9 by means of the pin 15.

The other end link 16 of the chain is adapted to be passed over the opposite end of the bracket 5 and also over the lever 6 when in the dotted position at A in Fig. 1.

When in the locked position (see Fig. 1 full lines) the link 16 engages within the transverse recess 10 and under the hook 13.

The operation of my invention is as follows.

The device is mounted by simply placing the bracket 5 transversely upon the wheel between adjacent spokes, so that the inner portion of the felly 1 engages within the transverse recess 8.

The chain 7 is then passed over the tire and the locking lever 6 is passed through the end link 16, the lever being in the dotted position "A" in Fig. 1.

This link 16 is then passed onto the end of the bracket 5 and the lever 6 moved from its unlocked position to its locked position. In the locked position the link 16 lies within the transverse recess 10 and also within the hooked portion 13 of the lever.

In this position it will be evident that the device cannot become accidentally disengaged, since the normal pull of the chain will be outwardly upon the hook 13, thus serving to maintain the device locked in position upon the wheel.

The device is disengaged by simply pressing the lever 6 into its unlocked position and removing the end link 16 from engagement therewith.

It is to be noted that any desired number of my devices may be used on a vehicle wheel and that, as each set is an entirely independent unit, any breakage which may occur to one will not in any way effect the remaining sets.

What I claim as my invention is:

1. A device of the class described comprising, a rigid bracket provided with a longitudinal recess in its inner side, a lever hingedly connected at one end to one end of the bracket and engageable within said recess, an inwardly directed hook formed on the lever adjacent to its hinge point, the inner side of the bracket provided with a further transverse recess adjacent to the hook on the lever, a chain, one end link of the chain secured to the bracket at the end remote from the hinge connection of the lever, the other end link of the chain adapted to pass over the opposite end of the bracket and the lever and to engage within the transverse recess in the bracket and also within the hook.

2. A device of the class described comprising, a rigid bracket provided with a longitudinal recess in its inner side, a lever hingedly connected at one end to one end of the bracket and engageable within said recess, an inwardly directed hook formed on the lever adjacent to its hinge point, the inner side of the bracket provided with a further transverse recess adjacent to the hook on the lever, a chain, one end link of the chain secured to the bracket at the end remote from the hinge connection of the lever, the other end link of the chain adapted to pass over the opposite end of the bracket and the lever and to engage within the transverse recess in the bracket and also within the hook, the bracket provided intermediately of its length with a transverse recess in its outer side.

ALBERT JOHN PARKHURST.

Witnesses:
 JOHN G. HAYWARD,
 NORMAN COLES.